(12) United States Patent
Miyazawa et al.

(10) Patent No.: US 7,377,654 B2
(45) Date of Patent: *May 27, 2008

(54) PROJECTION-TYPE DISPLAY APPARATUS AND CONTROL METHOD FOR PROJECTION-TYPE DISPLAY APPARATUS AS WELL AS CONTROL PROGRAM FOR PROJECTION-TYPE DISPLAY APPARATUS

(75) Inventors: Yasunaga Miyazawa, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/699,399

(22) Filed: Jan. 30, 2007

(65) Prior Publication Data

US 2007/0121077 A1    May 31, 2007

Related U.S. Application Data

(63) Continuation of application No. 11/041,455, filed on Jan. 25, 2005.

(30) Foreign Application Priority Data

Feb. 4, 2004   (JP)   ............................. 2004-028044

(51) Int. Cl.
*G03B 21/00* (2006.01)
*G03B 21/20* (2006.01)
*G03B 21/26* (2006.01)

(52) U.S. Cl. ............................. 353/31; 353/85; 353/94; 353/98; 353/99

(58) Field of Classification Search ............... 353/30, 353/31, 84, 85, 94, 98, 99, 121, 122; 359/290
See application file for complete search history.

(56) References Cited

U.S. PATENT DOCUMENTS

| 4,111,538 | A | * | 9/1978 | Sheridon ..................... 353/122 |
| 5,300,966 | A | | 4/1994 | Uehira et al. |
| 5,871,266 | A | | 2/1999 | Negishi et al. |
| 5,902,033 | A | * | 5/1999 | Levis et al. .................. 353/122 |
| 6,945,652 | B2 | * | 9/2005 | Sakata et al. ................. 353/30 |
| 6,953,251 | B2 | | 10/2005 | Seki et al. |
| 7,012,730 | B2 | | 3/2006 | Handschy et al. |
| 7,061,678 | B1 | | 6/2006 | Chikazawa |
| 7,072,096 | B2 | * | 7/2006 | Holman et al. ............. 359/298 |
| 7,081,956 | B1 | * | 7/2006 | Lalovic et al. .............. 356/400 |
| 7,131,735 | B2 | * | 11/2006 | Yokoyama ................... 353/98 |

FOREIGN PATENT DOCUMENTS

JP    A-2003-186110    7/2003

OTHER PUBLICATIONS

"Nikkei Electronics", Nov. 24, 2003, p. 114 (w/ partial English-language translation).

* cited by examiner

*Primary Examiner*—Melissa Jan Koval
(74) *Attorney, Agent, or Firm*—Oliff & Berridge, PLC (57) ABSTRACT

Exemplary embodiments provide a projection-type display apparatus, which can address or realize a reduction in weight and size, a reduction in power consumption, and a reduction in noise, and address or realize a reduction in price, and a control method for the projection-type display apparatus, as well as a control program for the projection-type display apparatus. The projection-type display apparatus includes a solid-state light source that emits light, a mirror device that controls an emitting direction of the incident light to thereby subject the incident light to temporal modulation, and a projecting device that projects the modulated light.

13 Claims, 9 Drawing Sheets

PROJECTION-TYPE DISPLAY APPARATUS AND CONTROL METHOD FOR PROJECTION-TYPE DISPLAY APPARATUS AS WELL AS CONTROL PROGRAM FOR PROJECTION-TYPE DISPLAY APPARATUS

This is a Continuation of application Ser. No. 11/041,455 filed Jan. 25, 2005. The disclosure of the prior application is hereby incorporated by reference herein in its entirety.

BACKGROUND

Exemplary embodiments of the present invention relate to a projection-type display apparatus, and a control method for the projection-type display apparatus, as well as a control program for the projection-type display apparatus.

A related art projection-type display apparatus (projector) uses a mirror device, such as a DMD (digital micro-mirror device; registered trademark) of Texas Instruments Incorporated as a light modulation device, other than a liquid crystal display device (LCD).

As a light source for this projection-type display apparatus, a high pressure mercury lamp emitting white light is usually used. The projection-type display apparatus separates the emitted white light into R, G, and B colors in a time axis direction using a color wheel, and further adjusts effective reflection times for the respective colors using respective micro-mirrors of DMD to thereby form a projection image (see, for example, "Nikkei Electronics", Nov. 24, 2003, p. 114).

SUMMARY

However, there is a problem in that, when a thermal light source generating heat described above is used as a lighting light source, conversion efficiency to convert inputted electric power into light is low and an input voltage is high, which results in an increase of power consumption in the thermal light source. In addition, there is a problem in that, since the thermal light source has a large power supply and a large lamp, a size of the projection-type display apparatus is increased and a cooling fan with high efficiency to cool the thermal light source is required, which results in an increase in noise due to driving sound of the cooling fan.

In order to address or solve the above, JP-A-2003-186110 discloses a technique that uses a light-emitting diode (LED), which emits lights of R (red), G (green), and B (blue), as a light source. The lights of the respective colors emitted from the LED are reflected by a dichroic prism and inputted to a DMD.

However, in this method, there is a problem in that the dichroic prism is required to make the lights of the respective colors emitted from the LED uniform, which results in an increase in cost and size of a projection-type display apparatus.

Exemplary embodiments of the invention address or solve the above, and provide a projection-type display apparatus, which can address or realize a reduction in weight and size, a reduction in power consumption, and a reduction in noise, and address or realize a reduction in price, and a control method for the projection-type display apparatus, as well as a control program for the projection-type display apparatus.

In order to address or attain the above, a projection-type display apparatus of an exemplary embodiment of the invention includes a solid-state light source that emits light, a mirror device that controls an emitting direction of the incident light to thereby subject the incident light to temporal modulation, and a projecting device that projects the modulated light.

Since the projection-type display apparatus of exemplary embodiments of the invention uses the solid-state light source, such as a light-emitting diode (LED) as a light source, compared with the high pressure mercury lamp described above, it is possible to address or realize the reduction in weight and size, the reduction in power consumption, and the reduction in noise of the projection-type display apparatus, as well as the reduction in price of the projection-type display apparatus.

In other words, since the solid-state light source has a low caloric value compared with the high pressure mercury lamp, efficiency to convert inputted electric power into light is high. Thus, when the same luminance is obtained, it is possible to reduce electric power to be inputted (the reduction in power consumption). It is also possible to reduce or prevent noise due to a cooling fan or the like (the reduction in noise). In addition, since the solid-state light source itself is lighter and smaller than the high pressure mercury lamp, it is possible to use a circuit to drive the solid-state light source smaller than a drive circuit for the high pressure mercury lamp. Consequently, to address or realize a reduction in cost of the projection-type display apparatus, it is more advantageous to use a solid-state light source array as a light source than using the high pressure mercury lamp as the light source.

Since the solid-state light sources are arranged and used as the solid-state light source array, light having a uniform illuminance distribution is made incident on a surface of a mirror device that is an object to be lighted by the light sources. Therefore, it is unnecessary to provide the dichroic prism unlike JP-A-2003-186110. This is advantageous to address or realize the reduction in weight and size and the reduction in price of the projection-type display apparatus.

In order to address or realize the structure described above, more specifically, it is desirable that the solid-state light source array is a solid-state light source array in which solid-state light sources emitting lights of different colors are arranged.

According to this structure, the projection-type display apparatus can emit lights of different colors from the solid-state light source array and form a color image by subjecting each of the lights of different colors to temporal modulation in the mirror device.

In addition, the solid-state light source array is formed by arranging the solid-state light sources that emit lights of different colors, it is unnecessary to provide a dichroic prism to synthesize lights of different colors. This is advantageous to address or realize the reduction in weight and size and the reduction of price of the projection-type display apparatus.

In order to address or realize the structure described above, more specifically, it is desirable that the projection-type display apparatus includes a measuring device that measures an intensity of emitted light from the mirror device and calculates a correction coefficient to correct the intensity of emitted light to a predetermined intensity on the basis of the intensity of the emitted light measured by the measuring device, and the mirror device is driven on the basis of the correction coefficient.

According to this structure, it is possible to control an intensity of emitted light from the mirror device to a predetermined intensity by controlling to drive the mirror device. Therefore, it is possible to display an image of predetermined brightness without being affected by external factors, such as aged deterioration of the light source.

In order to address or realize the structure described above, more specifically, it is desirable that the mirror device is formed by an arrangement of micro-mirrors that reflect incident light, a correction coefficient is calculated for each of the micro-mirrors, and the mirror device is driven for each of the micro-mirrors on the basis of the correction coefficient.

According to this structure, it is possible to control an intensity of emitted light from the mirror device for each of the micro-mirror. Therefore, for example, since it is possible to control emitted light intensities of the respective colors from the mirror device to predetermined intensities, it is possible to control a color balance of a projected image to a predetermined balance.

In order to address or realize the structure described above, more specifically, a measuring device may be arranged detachably insertable on a light path between the mirror device and the projecting device.

According to this structure, when an emitted light intensity is not measured by the measuring device, it is possible to detach the measuring device from the light path and discourage or prevent decline in an image quality without affecting a projected image. In addition, when an emitted light intensity is measured, since the measuring device is inserted in the light path to measure the emitted light intensity, it is possible to directly measure emitted light to be projected (modulated light) and measure an accurate modulated light intensity. Therefore, it is also possible to calculate a correct correction coefficient and control an intensity of modulated light to a predetermined intensity accurately.

In order to address or realize the structure described above, more specifically, the projection-type display apparatus may include a light guiding device that guides reflected light emitted from the mirror device to the projecting means, between the mirror device and the projecting device, and the measuring device and a reflecting plate may be arranged to be replaceable with each other.

According to this structure, when an emitted light intensity is measured by the measuring device, it is possible to directly measure emitted light to be projected (modulated light) and measure an accurate modulated light intensity by arranging the measuring device and the light guiding device to be replaced with each other. Therefore, it is also possible to calculate an accurate correction coefficient and control an intensity of modulated light to a predetermined intensity accurately. In addition, since the measuring device is arranged to be replaced with the original light guiding device when a modulated light intensity is not measured, it is possible to discourage or prevent the measuring device from being deteriorated by incident light.

In order to address or realize the structure described above, more specifically, the projection-type display apparatus has a reflecting plate, which reflects modulated light emitted from the mirror device to the projecting device, between the mirror device and the projecting device, the reflecting plate may be a light-transmissive reflecting plate that transmits a part of incident light, and the measuring device may be arranged in a position where the measuring device is capable of measuring the light transmitted through the reflecting plate.

According to this structure, since the measuring device measures a modulated light intensity transmitted through the reflecting plate, the measuring device never affects an image to be projected, and it is possible to discourage or prevent decline in an image quality. In addition, since a modulated light intensity can be measured by the measuring device even while an image is projected, it is possible to always discourage or prevent decline in an image quality.

In order to address or realize the structure described above, more specifically, the projection-type display apparatus may include an absorbing member that absorbs emitted light not made incident on the projecting device in the emitted light from the mirror device, and the measuring device and the absorbing member may be arranged to be replaceable with each other.

According to this structure, the measuring device and the reflecting plate are arranged to be replaced with each other when an emitted light intensity is measured by the measuring device, whereby it is possible to measure an intensity of emitted light not made incident on the projecting device (ineffective light). Since the ineffective light and the modulated light are in a one-to-one relation, it is possible to calculate a correction coefficient of the modulated light on the basis of the intensity of the ineffective light and control an intensity of the modulated light to a predetermined intensity.

Since an intensity of the ineffective light is measured, intensity measurement for the ineffective light can be performed even while an image is projected. Thus, it is possible to discourage or prevent the measuring device from being deteriorated.

In addition, since the absorbing member is always caused to absorb the ineffective light by the projecting device when the ineffective light is not measured, it is possible to discourage or prevent the measuring device from being deteriorated.

In order to address or realize the structure described above, more specifically, the projection-type display apparatus may include an absorbing member that absorbs emitted light not made incident on the projecting device in the light emitted from the mirror device, and the measuring device may also function as the absorbing member.

According to this structure, since the measuring device also functions as the absorbing member, an intensity of ineffective light can be measured by the measuring device even while an image is projected. Thus, it is possible to always discourage or prevent decline in an image quality.

In addition, it is unnecessary to provide both the measuring device and the absorbing member, which is advantageous to address or realize a reduction in weight and size of the projection-type display apparatus.

In order to address or realize the structure described above, more specifically, the projection-type display apparatus may include an absorbing member that absorbs emitted light not made incident on the projecting device in the light emitted from the mirror device, and the measuring device may be arranged to be detachably insertable on a light path between the mirror device and the absorbing member.

According to this structure, the measuring device is inserted on the light path between the mirror device and the absorbing member when an emitted light intensity is measured by the measuring device, whereby it is possible to measure an intensity of ineffective light. Further, it is possible to calculate a correction coefficient of modulated light on the basis of the intensity of the ineffective light and control an intensity of modulated light to a predetermined intensity Since an intensity of the ineffective light is measured, intensity measurement for the ineffective light can be performed even while an image is projected. Thus, it is possible to always discourage or prevent decline in an image quality.

In addition, since the absorbing member is always caused to absorb the ineffective light when the ineffective light is not measured, it is possible to discourage or prevent the measuring device from being deteriorated.

A control method for a projection-type display apparatus of an exemplary embodiment of the invention is a control method for a projection-type display apparatus that includes a solid-state light source array including solid-state light sources emitting light, a mirror device that controls an emitting direction of light made incident from the solid-state light source array to thereby subject the incident light to temporal modulation, and projecting device that projects the modulated light. The method includes: measuring an intensity of the modulated light emitted from the mirror device; calculating a correction coefficient to correct the intensity of the modulated light to a predetermined intensity; and controlling to drive the mirror device on the basis of the calculated correction coefficient.

The control method for a projection-type display apparatus of an exemplary embodiment of the invention can control an intensity of emitted light from the mirror device to a predetermined intensity by controlling to drive the mirror device. Therefore, it is possible to display an image of predetermined brightness without being affected by external factors, such as aged deterioration of a light source.

An exemplary embodiment of the invention provides a control program for a projection-type display apparatus that includes a solid-state light source array including solid-state light sources emitting light, a mirror device that controls an emitting direction of light made incident from the solid-state light source array to thereby subject the incident light to temporal modulation, and a projecting device that projects the modulated light. The program includes: a program for measuring an intensity of the modulated light emitted from the mirror device; a program for calculating a correction coefficient to correct the intensity of the modulated light to a predetermined intensity; and a program for controlling to drive the mirror device on the basis of the calculated correction coefficient.

The control program for a projection-type display apparatus of an exemplary embodiment of the invention can control an intensity of emitted light from the mirror device to a predetermined intensity by controlling to drive the mirror device. Therefore, it is possible to display an image of predetermined brightness without being affected by external factors, such as aged deterioration of a light source.

DETAILED DESCRIPTION OF EMBODIMENTS

A projection-type display apparatus and a control method for the projection-type display apparatus, as well as a control method for the projection-type display apparatus in accordance with exemplary embodiments of the invention, are explained below with reference to FIGS. 1 to 5.

First, a projection-type display apparatus in accordance with an exemplary embodiment of the invention is explained below with reference to FIG. 1. The projection-type display apparatus in accordance with this exemplary embodiment is a projection-type color display apparatus that subjects different color lights of R (red), G (green), and B (blue) emitted from an LED array to temporal modulation with a mirror device to display a color image.

Figure 1:
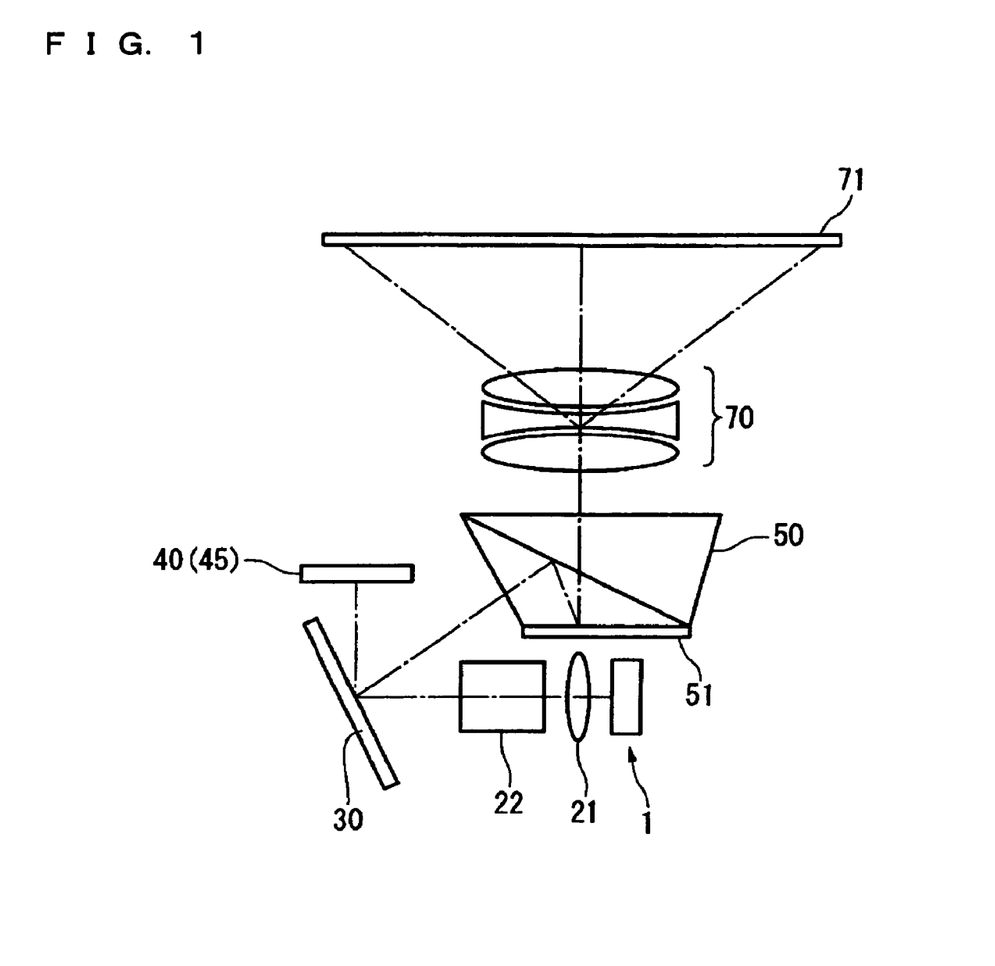
FIG. 1 is a schematic of a projection-type display apparatus in accordance with an exemplary embodiment of the invention.

FIG. 1 is a schematic showing the projection-type display apparatus in accordance with this exemplary embodiment.

As shown in FIG. 1, the projection-type display apparatus includes a lighting device (solid-state light source array) 1 that emits different color lights of R, G, and B, a mirror device 30 that subjects the color lights to temporal modulation, a measuring element (measuring device) 40 that measures an intensity of light emitted from the mirror device 30, and a projection lens (projecting device) 70 that projects modulated light subjected to the temporal modulation.

Figure 2:
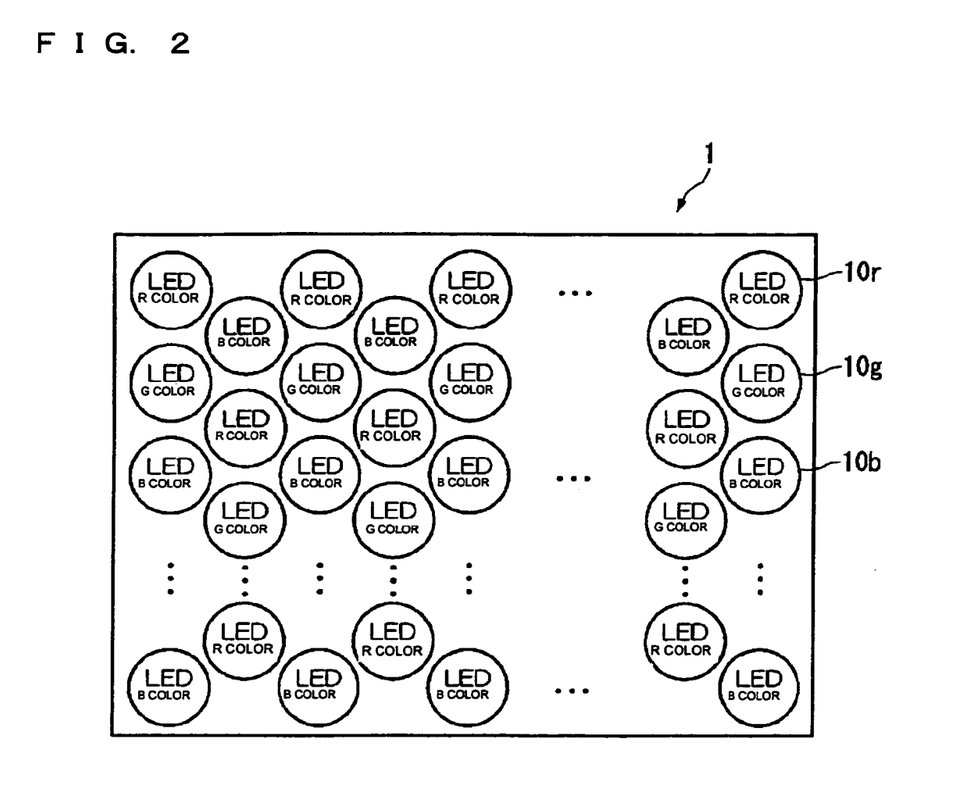
FIG. 2 is a schematic plan view showing a lighting device in accordance with the exemplary embodiment.

FIG. 2 is a schematic plan view showing the lighting device 1.

As shown in FIG. 2, the lighting device 1 is constituted as an LED array in which LEDs (solid-state light sources) 10*r*, 10*g*, and 10*b* emitting color lights of R, G, and B, respectively, are arranged two-dimensionally. More specifically, a column including the LEDs 10*r*, 10*g*, and 10*b* repeatedly arranged in this order in a vertical direction is formed, and a plurality of the columns are arranged in a horizontal direction, whereby the lighting device 1 is formed. In addition, the columns adjacent to each other in the horizontal direction are arranged to be shifted to the vertical direction by half an interval of arrangement of the LEDs such that the LEDs 10*r*, 10*g*, and 10*b* can be arranged densely. Moreover, the LEDs 10*r*, 10*g*, and 10*b* are arranged, such that the LEDs emitting the same color lights are not adjacent to each other.

A condensing lens 21 is arranged on a light emitting side of the lighting device 1 in order to condense respective color lights emitted from the lighting device 1 on the mirror device 30 that is an object to be lighted. A relay lens 22, which guides the respective color lights emitted from the lighting device 1 to the mirror device 30, is also arranged on the light emitting side of the lighting device 1.

As described above, the condensing lens 21 and the relay lens 22 may be arranged between the lighting device 1 and the mirror device 30. An integrator lens such as a fly-eye lens or a rod lens, which makes an illuminance distribution of the respective color lights emitted from the lighting device 1, may be arranged additionally.

The mirror device 30 has micro-mirrors corresponding to pixels of an image arranged, in a matrix shape and is arranged such that an orientation of reflection surfaces of the micro-mirrors can be changed (so as to be able to swing). The mirror device 30 can subject the respective color lights to temporal modulation to divide the respective color lights into modulated light to be projected and displayed and ineffective light to be absorbed and control a ratio of the modulated light to 0% to 100% by controlling emitting directions of incident respective color lights on the basis of a video signal subjected to signal processing.

An absorbing member 45 is arranged to absorb the ineffective light emitted from the mirror device 30 and is arranged to be replaceable with a measuring element 40 described below.

A prism 50, which guides light emitted from the mirror device 30 to a projection lens 70, is arranged on a path of modulated light between the mirror device 30 and the projection lens 70. The prism 50 has a structure in which triangle prisms are bonded, and a mirror surface reflecting the modulated light is formed on an inner surface thereof diagonally. In addition, a reflecting plate (light guiding device) 51 is arranged on a surface that is opposed to the mirror surface of the prism 50 and adjacent to the surface on which the modulated light is made incident.

The measuring element 40 is arranged to be replaceable with the absorbing member 45 and is arranged to be capable of measuring an intensity of ineffective light from the mirror device 30. In addition, the measuring element 40 includes photosensors, such as charge coupled devices (CCDs) or CMOSs arranged in a matrix shape.

The projection lens 70 is arranged to project modulated light emitted from the prism 50 on a screen 71 in enlargement.

Next, an action in projection of an image by the projection-type display apparatus including the structure described above is explained below.

First, when an image is projected, as shown in FIG. 1, the absorbing member 45 is arranged to absorb ineffective light from the mirror device 30.

As shown in FIGS. 1 and 2, the LEDs 10r, 10g, and 10b of the lighting device 1 are turned on in a time division manner for each of the color lights of R, G, and B. The respective color lights emitted from the lighting device 1 in a time division manner are made incident on the mirror device 30 via the condensing lens 21 and the relay lens 22.

The respective color lights made incident on the mirror device 30 are subjected to temporal modulation for each of the micro-mirrors on the basis of a video signal inputted to the projection-type display apparatus. Modulated light is reflected to the prism 50 and ineffective light is reflected to the absorbing member 45.

The modulated light emitted from the mirror device 30 is made incident on the prism 50, reflected on the mirror surface in the prism 50 to be made incident on the reflecting plate 51, and reflected to the projection lens 70.

The light reflected in the direction of the projection lens 70 is made incident on the projection lens 70 and projected on the screen 71 in enlargement.

Here, a method of temporally modulating the modulated light modulated by one micro-mirror of the mirror device 30 so as to have a predetermined intensity is explained below.

Figure 3A:
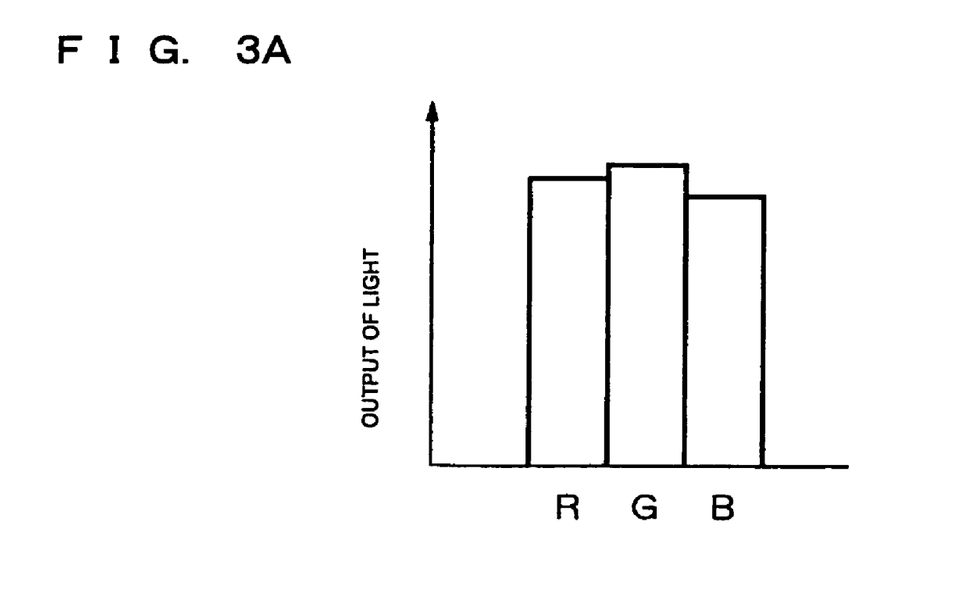
FIGS. 3A and 3B are schematics explaining temporal modulation performed by a mirror device in accordance with the exemplary embodiment.
Figure 3B:
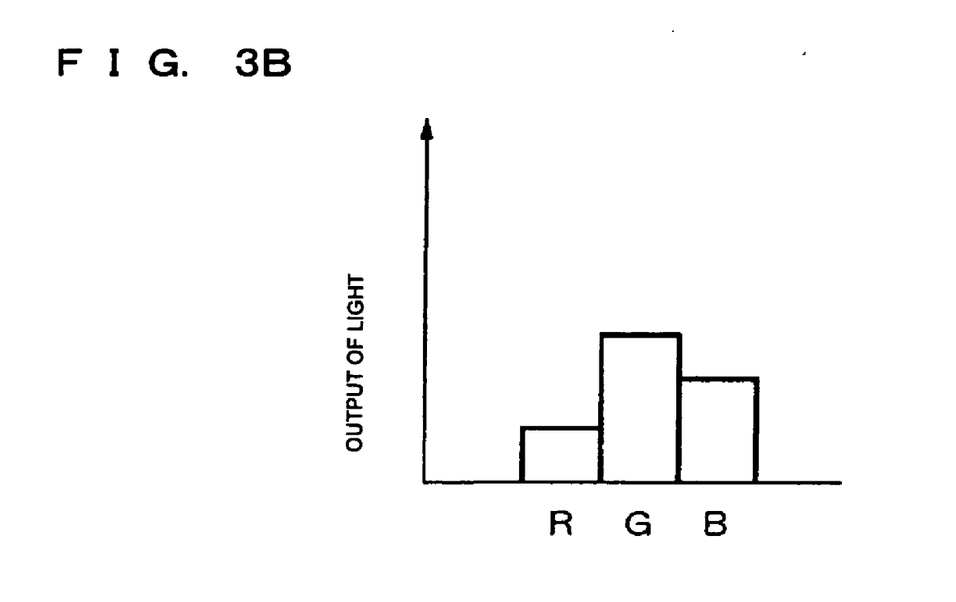

FIG. 3A is a schematic showing intensities of the respective color lights, which are made incident on the micro-mirror, in the case in which the LEDs are lighted for a fixed time. FIG. 3B is a schematic showing intensities of modulated lights modulated by the micro-mirror in a predetermined frame.

When the LEDs 10r, 10g, and 10b are lighted for a fixed time, as shown in FIG. 3A, the respective color lights of R, G, and B are made incident on the micro-mirror of the mirror device 30 at respective intensities. An intensity balance of the respective color lights of R, G, and B in this state indicates white. From this state, the intensity balance of the respective color lights of R, G, and B is changed to an intensity balance of the respective color lights of R, G, and B, for example, shown in FIG. 3B to display a predetermined color.

Figure 4:
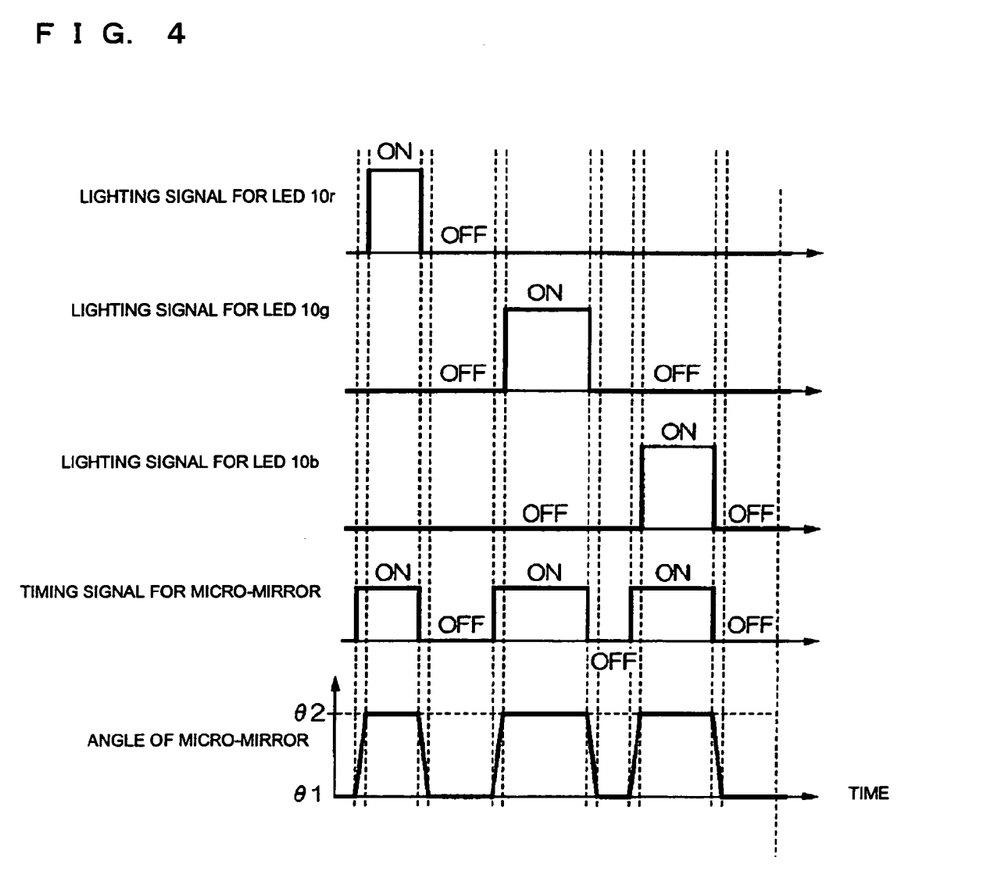
FIG. 4 is a schematic explaining temporal modulation performed by the mirror device and an LED in accordance with the exemplary embodiment.

FIG. 4 is a schematic showing timing of lighting control for the LEDs and timing of time control for the micro-mirror.

The method of changing an intensity balance of the respective color lights of R, G, and B according to the temporal modulation is specifically described below.

First, a timing signal for the micro-mirror is inputted (ON) to drive the mirror device, such that reflected light of the micro-mirror corresponding to the color light R is made incident on the prism 50. At this point, the micro-mirror is driven upon the input of the timing signal and an angle of the micro-mirror is changed from an angle $\theta 1$ at which the reflected light is made incident on the absorbing member 45 to an angle $\theta 2$ at which the reflected light is made incident on the prism 50. It takes time to change the angle of the micro-mirror from the angle $\theta 1$ at which the reflected light is made incident on the absorbing member 45 to the angle $\theta 2$ at which the reflected light is made incident on the prism 50. This time is defined as a mirror rotation time Tr.

The LED 10r emitting the color light R is turned on after the mirror rotation time Tr has elapsed from the input of the timing signal. This state is maintained for a predetermined time.

Then, the timing signal is turned OFF after the predetermined time has elapsed. Consequently, the LED 10r is turned off and the micro-mirror is driven, such that an orientation of the micro-mirror is at the angle $\theta 1$ at which the reflected light is made incident on the absorbing member 45. It is possible to perform such drive control for the micro-mirror of the mirror device 30 in an order of about 5000 Hz.

The control described above is also performed for the remaining color lights G and B to change an intensity balance of the respective color lights of R, G, and B.

The drive method for the projection-type display apparatus in accordance with this exemplary embodiment is explained below.

Figure 5:
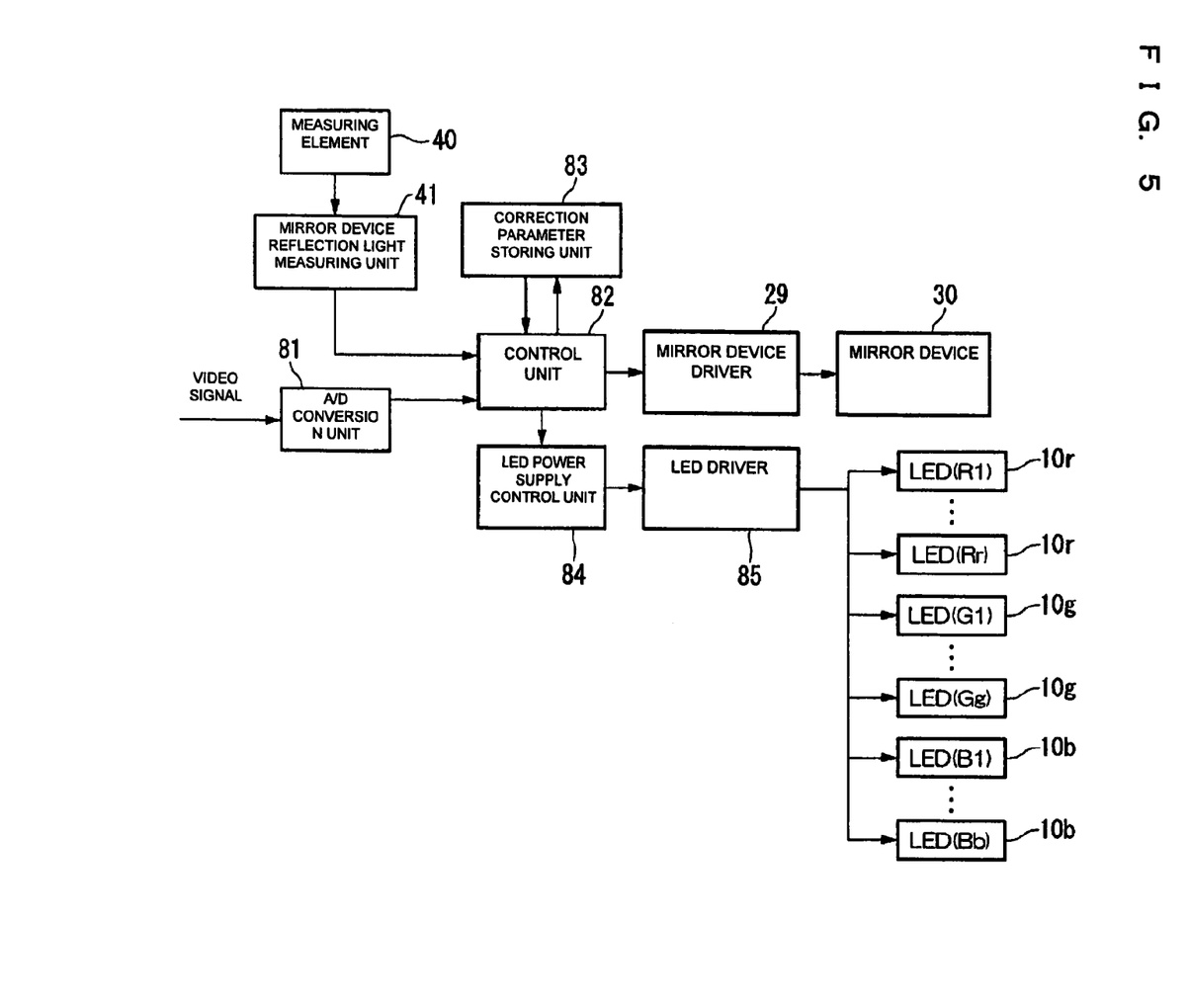
FIG. 5 is a schematic showing a structure of a drive circuit of the projection-type display apparatus.

FIG. 5 is a schematic showing a structure of a drive circuit of the projection-type display apparatus in accordance with this exemplary embodiment.

First, a method of acquiring a correction parameter to correct an intensity of modulated light emitted from the mirror device 30 to a predetermined intensity using the measuring element 40 is explained below.

First of all, as shown in FIG. 1, the measuring element 40 is arranged instead of the absorbing member 45, such that ineffective light from the mirror device 30 is made incident on the measuring element 40.

As shown in FIG. 5, a control unit 82 controls the LEDs 10r, 10g, and 10b for each of the color lights so as to light at a constant voltage for a fixed time. Then, the control unit 82 controls ineffective light emitted by a predetermined micro-mirror of the mirror device 30 so as to be made incident on the measuring element 40 for a fixed time. The control unit 82 can acquire a correction parameter for each of the micro-mirrors by performing control as described above.

The measuring element 40 outputs a signal corresponding to an intensity of the incident ineffective light to a mirror device reflection light measuring unit 41, and the mirror device reflection light measuring unit 41 calculates an intensity of modulated light from the intensity of the ineffective light.

The calculation of an intensity of modulated light is performed for all the color lights and all the micro-mirrors.

The intensity of the modulated light obtained by the method described above is inputted to the control unit 82. The control unit 82 calculates correction parameters to control an effective reflection time of the micro-mirrors in the respective color lights based on the intensity of the modulated light such that a target white color (e.g., 8300°K. in a color temperature) is obtained when the modulated lights of R, G, and B from the respective micro-mirrors are subjected to time integration.

Then, the control unit 82 outputs the calculated correction parameters in the respective micro-mirrors to a correction parameter storing unit 83 and causes the correction parameter storing unit 83 to store the correction parameters.

Next, a method of driving the projection-type display apparatus on the basis of a video signal and a control program for the projection-type display apparatus are explained below.

In this exemplary embodiment, as shown in FIG. 5, for example, a video signal, which is an analog signal, outputted from a PC, a DVD, a TV antenna, or the like is inputted to an A/D conversion unit 81, converted into a digital signal, and inputted to the control unit 82.

When a video signal to be inputted to the projection-type display apparatus is a digital signal, the A/D conversion unit 81, which converts an analog signal into a digital signal, is unnecessary, and a digital signal may be inputted to the control unit 82 directly. In addition, when a video signal to be inputted to the projection-type display apparatus is compressed data, such as MPEG2 data, a decoder unit, which decodes compressed data, may be provided instead of the A/D conversion unit 81 to input a compressed signal to the decoder unit, or a decode function may be given to the control unit 82 to input a compressed signal to the control unit 82.

The control unit 82 generates a modulation control signal, which is outputted to the mirror device 30, on the basis of the video signal converted into the digital signal and the correction parameters stored in the correction parameter storing unit 83. The generated modulation control signal is outputted to a mirror device driver 29, and the mirror device driver 29 controls to drive the respective micro-mirrors of the mirror device 30 on the basis of the modulation control signal At the same time, the control unit 82 generates a light source control signal to control turning on and off of the LEDs 10*r*, 10*g*, and 10*b* on the basis of the video signal converted into the digital signal and the correction parameters stored in the correction parameter storing unit 83. The generated light source control signal is outputted to an LED power supply control unit 84, and the LED power supply control unit 84 controls turning on and off of the respective LED 10*r*, 10*g*, and 10*b* via an LED driver 85.

Correction parameters may be acquired only once when the projection-type display apparatus is manufactured and shipped or may be acquired periodically even after the shipment.

In the method of acquiring correction parameters only once when the projection-type display apparatus is shipped, since the measuring element 40 is never used after the shipment, it is possible to remove the measuring element 40 and address or realize a reduction in weight and size and a reduction in price of the projection-type display apparatus easily.

In the method of acquiring correction parameters periodically even after the shipment, it is possible to cope with a change in a color balance or the like due to aged deterioration of the LEDs 10*r*, 10*g*, and 10*b* and the mirror device 30 and maintain a high quality image easily.

As described above, the measuring element 40 and the absorbing member 45 may be arranged to be replaceable with each other, or the measuring element 40 may also function as the absorbing member 45. According to this structure, since intensity measurement for ineffective light can be performed by the measuring element 40 even while an image is projected, it is possible to always discourage or prevent decline in an image quality In addition, it is unnecessary to provide the measuring element 40 and the absorbing member 45. This is advantageous to address or realize a reduction in weight and size of the projection-type display apparatus.

According to the structure described above, since the LEDs 10*r*, 10*g*, and 10*b* are used as light sources, compared with the high pressure mercury lamp described above, efficiency of converting inputted electric power to light is high. Thus, when the same luminance is obtained, it is possible to reduce electric power to be inputted (the reduction in power consumption). Since a caloric value is also low, it is also possible to discourage or prevent noise due to a cooling fan or the like (the reduction in noise). In addition, since the LEDs 10*r*, 10*g*, and 10*b* themselves are lighter and smaller than the high pressure mercury lamp, it is possible to use a circuit to drive the LEDs 10*r*, 10*g*, and 10*b* smaller than a drive circuit for the high pressure mercury lamp. Consequently, to address or realize a low cost of the projection-type display apparatus, it is more advantageous to use the LEDs 10*r*, 10*g*, and 10*b* as light sources than using the high pressure mercury lamp as a light source.

Since the LEDs 10*r*, 10*g*, and 10*b* are arranged and used as an LED array, light having a uniform illuminance distribution is made incident on the surface of the mirror device 30 that is an object to be lighted of the light source. Therefore, it is unnecessary to provide the dichroic prism unlike JP-A-2003-186110. This is advantageous to address or realize the reduction in weight and size and the reduction in price of the projection-type display apparatus.

Moreover, since the LED array is formed by arranging the LEDs 10*r*, 10*g*, and 10*b* emitting the respective color lights of R, G, and B, it is possible to form a color image without providing a dichroic prism to synthesize different color lights. This is advantageous to address or realize a reduction in weight and size and a reduction in price of the projection-type display apparatus.

An intensity of emitted light from the mirror device 30 can be controlled for each of the micro-mirrors. Thus, for example, since emitted light intensities of the respective color lights can be controlled to predetermined intensities, it is possible to control a color balance of an image to be projected to a predetermined balance. In addition, it is possible to display an image of predetermined brightness without being affected by external factors, such as aged deterioration of a light source.

When an intensity of emitted light from the mirror device 30 is measured by the measuring element 40, the measuring element 40 and the absorbing member 45 are arranged to be replaced with each other, whereby it is possible to measure an intensity of ineffective light.

Since the modulated light and the ineffective light are in a one-to-one relation, it is possible to calculate a correction parameter for the modulated light on the basis of the intensity of the ineffective light not made incident on the projection lens 70 and control an intensity of the modulated light to be made incident on the projection lens 70 to a predetermined intensity.

Since an intensity of the ineffective light is measured, intensity measurement for the ineffective light can be performed even while an image is projected. Accordingly, it is possible to prevent decline in an image quality. In addition, the absorbing member 45 is always caused to absorb the ineffective light when an intensity of the ineffective light is not measured. Thus, it is possible to discourage or prevent the measuring element 40 from being deteriorated.

Figure 6:
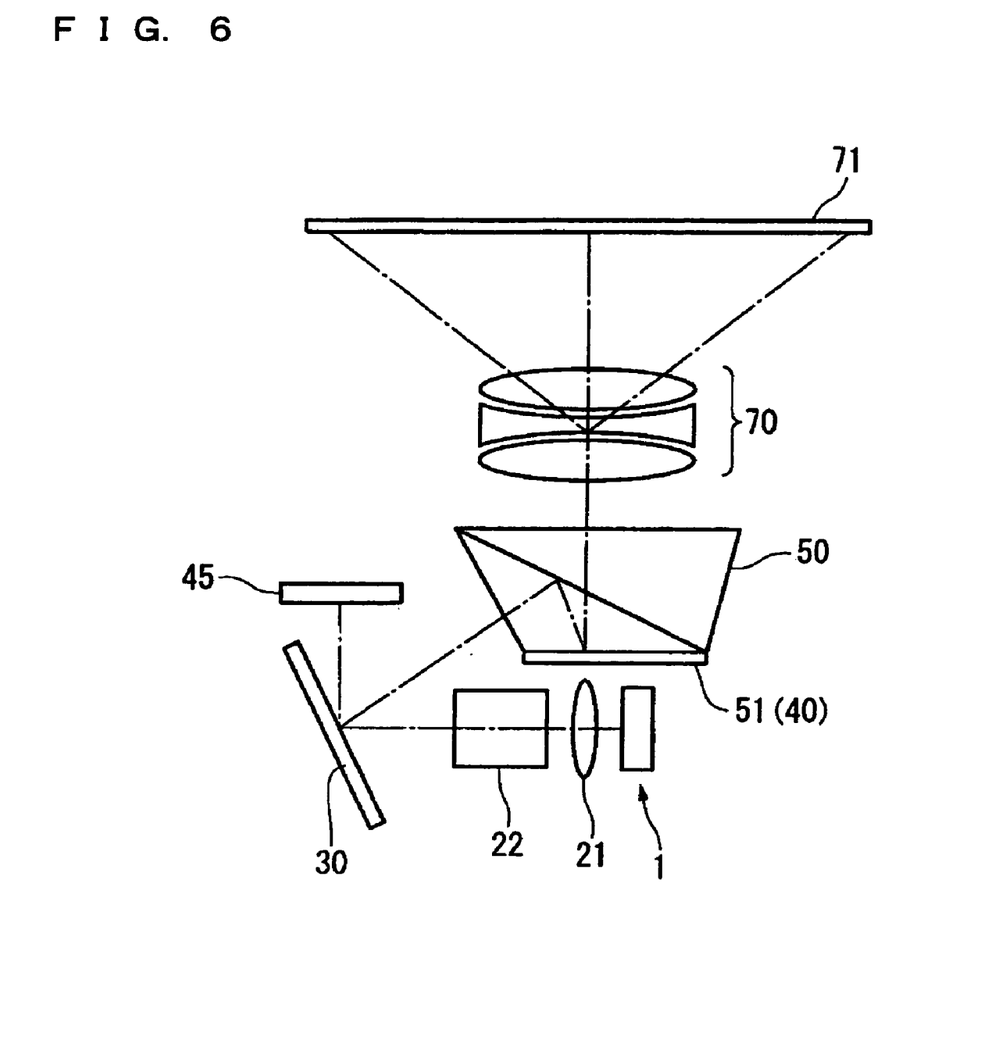
FIG. 6 is a schematic of a projection-type display apparatus in accordance with another exemplary embodiment of the invention.

As described above, the measuring element 40 may be arranged to be replaceable with the absorbing member 45, or as shown in FIG. 6, may be arranged to be replaceable with the reflecting plate 51. According to this structure, it is possible to measure a modulated light intensity directly with the measuring element 40 and measure an accurate modulated light intensity. Therefore, it is possible to calculate an accurate correction parameter easily and control the modulated light intensity to a predetermined intensity accurately. In addition, when a modulated light intensity is not measured, since the measuring element 40 is arranged to be replaced with the original reflecting plate 51, it is possible to discourage or prevent the measuring element 40 from being deteriorated by incident light.

Figure 7:
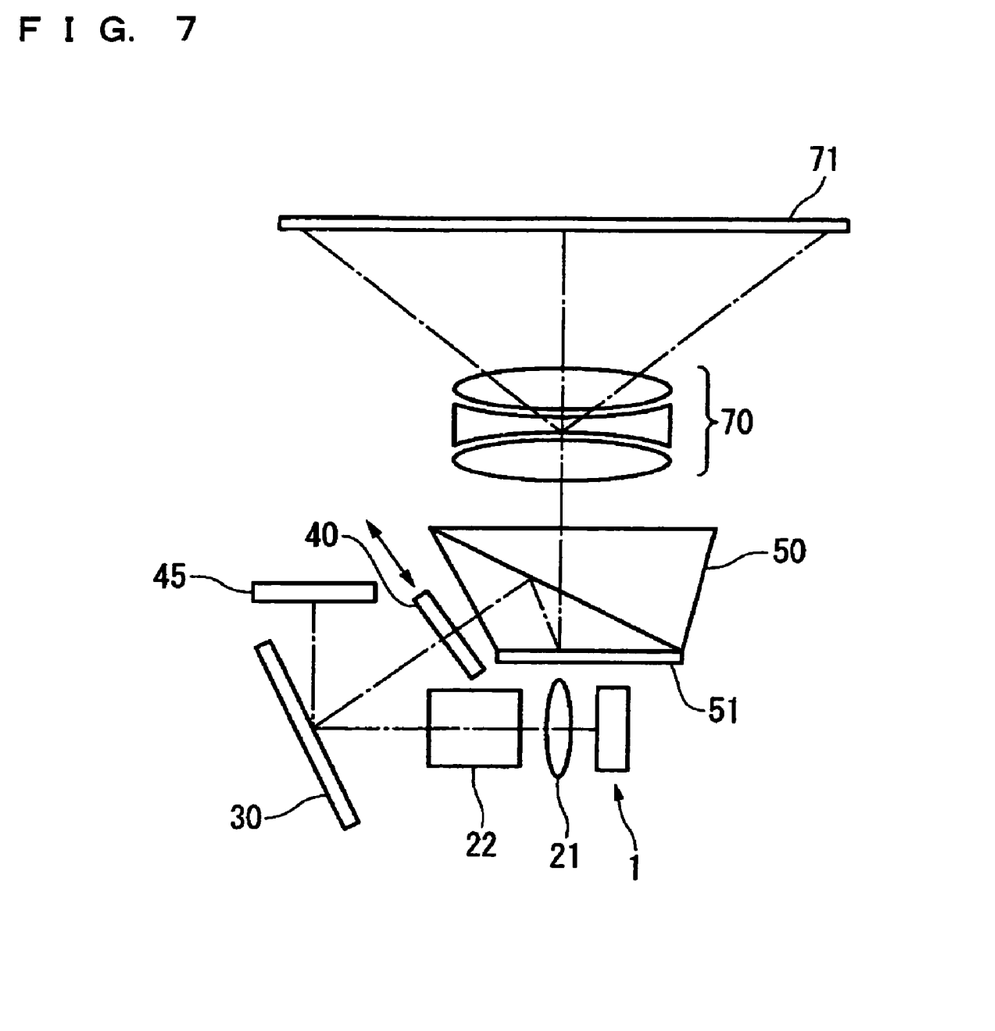
FIG. 7 is a schematic of a projection-type display apparatus in accordance with still another exemplary embodiment of the invention.

As shown in FIG. 7, the measuring element 40 may be arranged to be detachably insertable on a path of modulated light between the mirror device 30 and the prism 50. According to this structure, when an emitted light intensity is not measured by the measuring element 40, it is possible to detach the measuring element 40 from the path of modulated light and prevent decline in an image quality without affecting an image to be projected. In addition, when a modulated light intensity is measured, since the measuring element 40 is inserted into the path of modulated light to measure the modulated light intensity, it is possible to measure the modulated light intensity directly and measure an accurate modulated light intensity. Therefore, it is possible to calculate an accurate correction parameter easily and control an intensity of modulated light to a predetermined intensity accurately.

Figure 8:
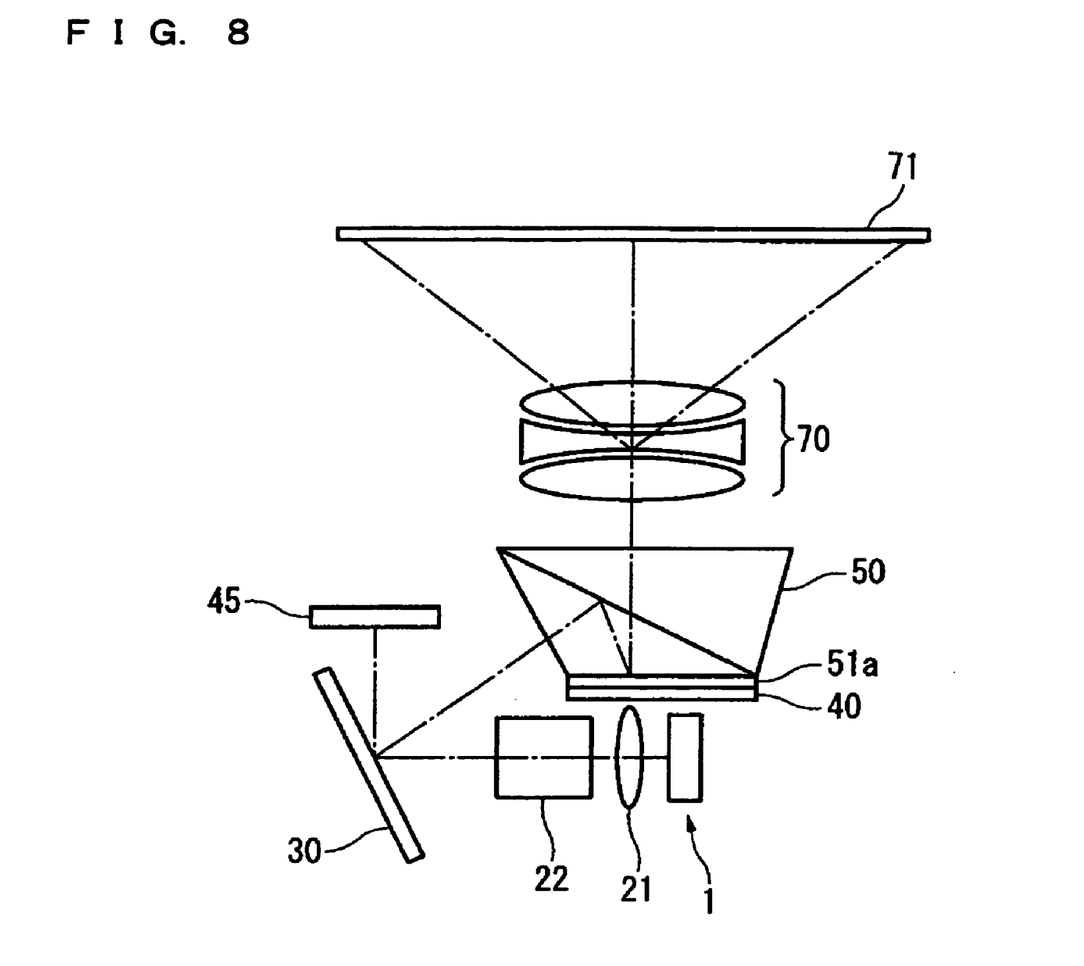
FIG. 8 is a schematic of a projection-type display apparatus in accordance with still another exemplary embodiment of the invention.

As shown in FIG. 8, the reflecting plate may be a reflecting plate 51*a* having transmissivity to transmit several percent of incident modulated light, and the measuring element 40 may be arranged to measure modulated light transmitted through the reflecting plate 51*a*. According to this structure, the measuring device measures an intensity of emitted light (modulated light) transmitted through the reflecting plate. Thus, the measuring device never affects an image to be projected, and it is possible to discourage or prevent decline in an image quality. In addition, since measurement of an emitted light intensity by the measuring device can be performed even while an image is projected, it is possible to always discourage or prevent decline in an image quality.

Figure 9:
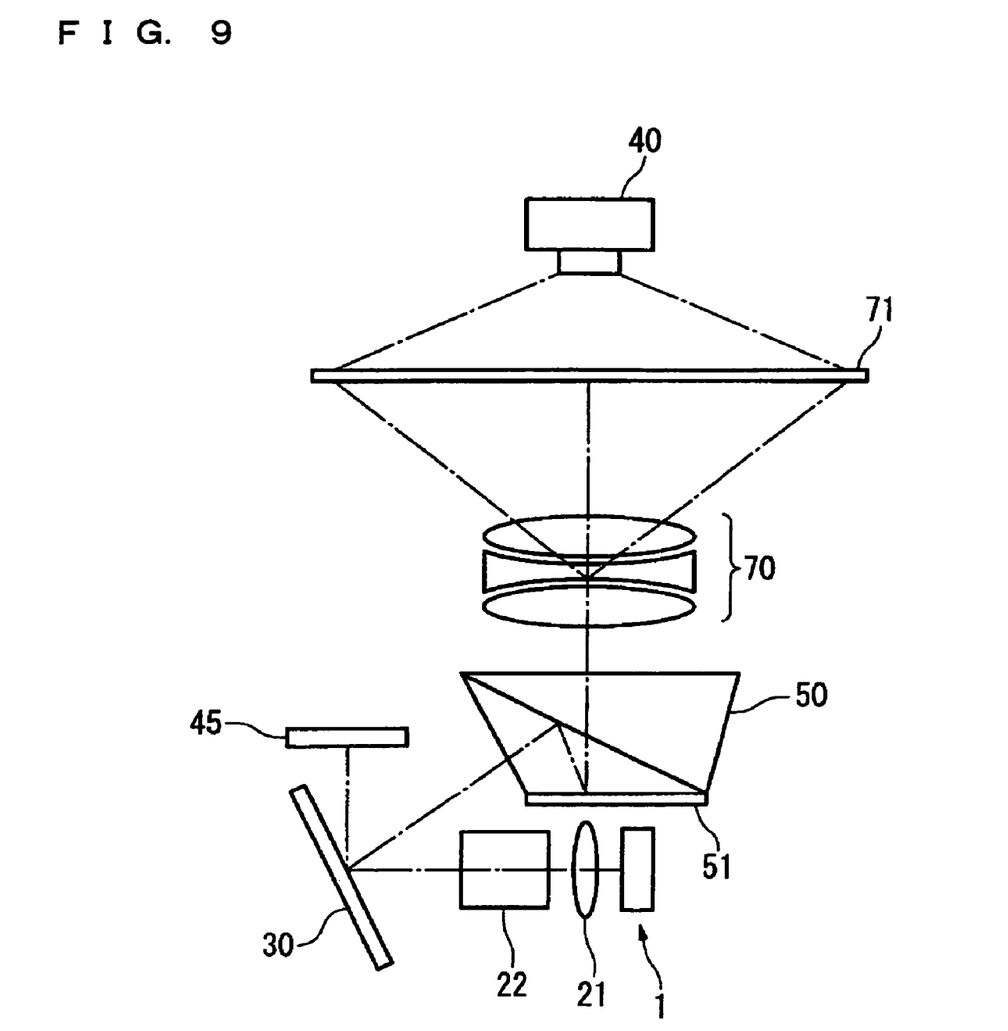
FIG. 9 is a schematic of a projection-type display apparatus in accordance with still another exemplary embodiment of the invention.

In addition, as shown in FIG. 9, brightness of an image projected on the screen 71 may be measured by the measuring element 40. According to this structure, since it is unnecessary to set the measuring element 40 in the projection-type display apparatus, it is possible to address or realize a reduction in weight and size of the projection-type display apparatus.

A technical scope of the invention is not limited to the exemplary embodiments described above, and it is possible to apply various modifications to the invention within a range not departing from the spirit of the invention.

For example, in the exemplary embodiments described above, the invention is explained in the application to the structure in which the LED array, which emits color lights of R, G, and B, is used as a light source. However, the invention is not limited to the LED array that emits different color lights but can also be applied to various other structures, such as a structure in which a color wheel is provided in an LED array that emits a white light.

In addition, in the exemplary embodiments described above, the invention is explained in the application to the structure to calculate a correction parameter using the measuring element 40. However, the invention is not limited to the structure using the measuring element 40 but can also be applied to various other structures, such as a structure with which a viewer can input a correction parameter according to preference of the viewer.

What is claimed is:

1. A projection-type display apparatus, comprising:
   a solid-state light source array that includes solid-state light sources emitting light;
   a mirror device that selectively controls an emitting direction of the light incident from the solid-state light source array to thereby subject the incident light to temporal modulation; and
   a projecting device that projects the modulated light.

2. The projection-type display apparatus according to claim 1, the solid-state light source array being a solid-state light source array including solid-state light sources emitting lights of different colors.

3. The projection-type display apparatus as set forth in claim 2,
   the solid-state light source array having a plurality of solid-state light sources that emit one color light from the different color lights, and
   the plurality of solid-state light sources, which emit the one color light from the different color lights, being not adjacent to each other.

4. The projection-type display apparatus as set forth in claim 2,
   the solid-state light source array having a plurality of types of the solid-state light sources, wherein each type comprises a plurality of solid-state light sources that emit a same one of the different colors of light different from the other types, and
   the solid-state light sources of the same color light being not adjacent to each other.

5. The projection-type display apparatus as set forth in claim 2,
   one frame being projected by causing only solid-state light sources which emit the same color light to emit color light, and doing this respectively for the different color lights.

6. The projection-type display apparatus as set forth in claim 1,
   wherein the solid-state light source array includes
   a first solid-state light source group in which a plurality of the solid-state light sources are arranged in a first direction, and
   a second solid-state light source group in which the solid-state light sources are arranged in a state which is the same state as arranging in the first solid-state light source group,
   the first and second solid-state light source groups being arranged in a second direction different from the first direction.

7. The projection-type display apparatus as set forth in claim 6,
the second direction being a direction perpendicular to the first direction.

8. The projection-type display apparatus as set forth in claim 6,
the solid-state light sources arranged in the first solid-state light source group and the solid-state light sources arranged in the second solid-state light source group being arranged in positions that are shifted in the first direction.

9. The projection-type display apparatus as set forth in claim 6,
in the first and second solid-state light source groups adjacent to each other, the second solid-state light source group being arranged in a state of being shifted, in the first direction, with respect to the first solid-state light source group by half of an arrangement interval of the solid-state light sources arranged in the first solid-state light source group.

10. The projection-type display apparatus according to claim 1, further comprising a lens arranged between the solid-state light source array and the mirror device.

11. The projection-type display apparatus according to claim 1, further comprising an absorbing device arranged at a position that the emitted light, reflected by the mirror device and not going to the projection lens, reaches.

12. The projection-type display apparatus according to claim 1, wherein a timing of lighting control for the solid-state light sources and a timing of time control for the mirror device are synchronized.

13. The projection-type display apparatus according to claim 1, wherein the mirror device is configured to control an emitting direction of the light incident from selected solid-state light sources of the solid-state light source array.

* * * * *